(12) United States Patent
Chekroun et al.

(10) Patent No.: US 10,031,252 B2
(45) Date of Patent: Jul. 24, 2018

(54) DEVICE FOR DETECTING OBJECTS SUCH AS MINES

(76) Inventors: Claude Chekroun, Gif-sur-Yvette (FR); Olivier Bohbot, Boulogne Billancourt (FR); Roland Seneor, Bures-sur-Yvette (FR)

( * ) Notice: Subject to any disclaimer, the term of this patent is extended or adjusted under 35 U.S.C. 154(b) by 962 days.

(21) Appl. No.: 14/130,644

(22) PCT Filed: Jul. 5, 2012
(Under 37 CFR 1.47)

(86) PCT No.: PCT/FR2012/000268
§ 371 (c)(1),
(2), (4) Date: Jan. 2, 2014

(87) PCT Pub. No.: WO2013/004924
PCT Pub. Date: Jan. 10, 2013

(65) Prior Publication Data
US 2014/0121969 A1 May 1, 2014

(30) Foreign Application Priority Data
Jul. 6, 2011 (FR) ...................................... 11 56098

(51) Int. Cl.
*G01V 3/00* (2006.01)
*G01V 7/00* (2006.01)
(Continued)

(52) U.S. Cl.
CPC ........... *G01V 3/104* (2013.01); *F41H 11/136* (2013.01); *G01V 3/17* (2013.01)

(58) Field of Classification Search
CPC ........... G06K 9/00798; G06K 9/00791; G06K 9/00818; G06K 9/00805; G06K 9/00355; G06K 9/00845; H04L 2012/40234; H04L 2012/40241; H04L 2012/40273; H04L 41/0809; H04L 63/0435; H04L 63/06;
(Continued)

(56) References Cited

U.S. PATENT DOCUMENTS 4,635,060 A * 1/1987 Mertens .................. G01S 7/288
342/173
5,025,218 A 6/1991 Ramstedt
(Continued)

FOREIGN PATENT DOCUMENTS

EP 0 812 005 12/1997

OTHER PUBLICATIONS https://lta.cr.usgs.gov/SAR.*
(Continued)

*Primary Examiner* — Roy Y Yi
(74) *Attorney, Agent, or Firm* — Pillsbury Winthrop Shaw Pittman LLP

(57) ABSTRACT

A device for detecting objects such as mines placed in a zone to be explored, the device being placed on a vehicle moving at a velocity V and including a panel on which a radiation set is arranged to transmit signals at an illumination frequency and to receive signals reflected from the zone, and a processing circuit to provide information about the presence of the objects after processing of the reflected signals, wherein the radiation set includes an alignment of antennas arranged transverse to the velocity V of displacement of the vehicle.

11 Claims, 3 Drawing Sheets

Figure 1:
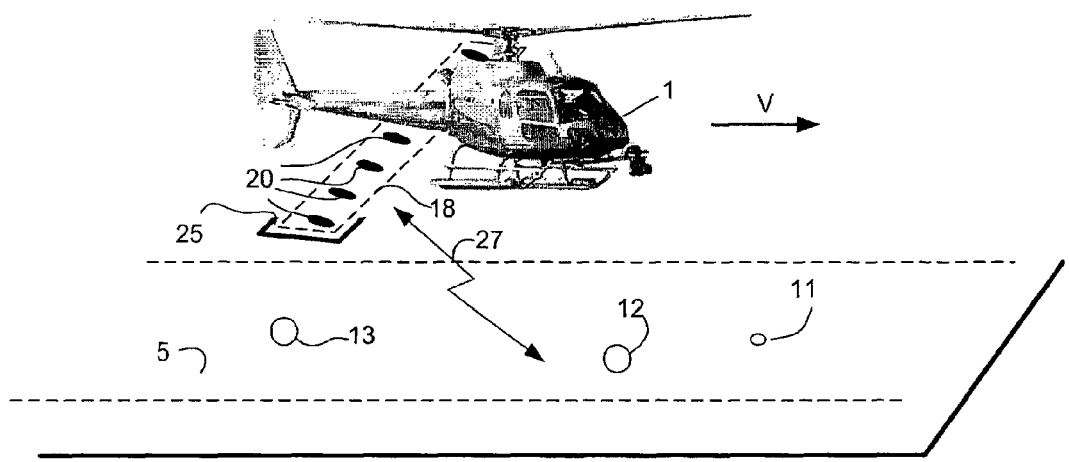

(51) Int. Cl.
  *G01V 3/10*       (2006.01)
  *F41H 11/136*     (2011.01)
  *G01V 3/17*       (2006.01)

(58) Field of Classification Search
  CPC . H04L 63/0823; H04L 63/0876; H04L 63/12; G01S 19/03; G01S 19/13; G01S 2007/4082; G01S 2013/9332; G01S 2013/9357; G01S 2013/9375; G01S 2013/9378
  See application file for complete search history.

(56) References Cited

U.S. PATENT DOCUMENTS

| | | | | |
|---|---|---|---|---|
| 6,894,637 | B2* | 5/2005 | Moreira | G01S 13/9035 |
| | | | | 342/22 |
| 8,242,952 | B1* | 8/2012 | Barr | G01S 7/412 |
| | | | | 342/159 |
| 2004/0118313 | A1 | 6/2004 | Temes et al. | |
| 2006/0255999 | A1* | 11/2006 | Egri | G01S 13/106 |
| | | | | 342/25 R |
| 2008/0218170 | A1 | 9/2008 | Stolarczyk et al. | |
| 2009/0238426 | A1* | 9/2009 | Fear | G06K 9/3216 |
| | | | | 382/128 |

OTHER PUBLICATIONS http://www.radartutorial.eu/06.antennas/Tapered%20Slot%20Antenna.en.html.*
Panze, Ben Development of an Electrically small Vivaldi Antenna: the CreSIS aerial Vivaldi, University of Kansas 2004.*
International Search Report as issued for International Application No. PCT/FR2012/000268, dated Dec. 14, 2012.

* cited by examiner

DEVICE FOR DETECTING OBJECTS SUCH AS MINES

CROSS-REFERENCE TO RELATED APPLICATIONS

This is the U.S. National Stage of PCT/FR2012/000268, filed Jul. 5, 2012, which in turn claims priority to French Patent Application No. 1156098, filed Jul. 6, 2011, the entire contents of all applications are incorporated herein by reference in their entireties.

This invention relates to a device for detecting objects such as mines placed in a zone to be explored, said device being placed on a vehicle moving at a velocity V and formed from a panel on which a radiation set is arranged and a processing circuit to provide information about the presence of such objects.

Such a device is disclosed in patent document EP 0 812 005 and can be used in many applications. This known device is not suitable for detecting objects with small dimensions designed to be difficult to detect. Furthermore, it is considered to be disadvantageous when the panel is large due to deformation of the panel causing an inconsistency between emitted and reflected waves that is difficult to get around even if appropriate circuits are used to measure these deformations.

The invention discloses a device of the type mentioned in the preamble that has good performances. Thus, it becomes possible to detect mines buried in sand. These mines are often designed to be undetectable and consequently have a dielectric constant similar to the dielectric constant of the sand in which they can be buried. The result is that their coefficient of reflection is similar to that of the sand that surrounds them making them difficult to detect by electromagnetic radiation.

This invention discloses different measures for detecting objects that are difficult to detect, and therefore capable of detecting various sized mines such an antipersonnel mines or antitank mines, these mines possibly being in the ground that do not facilitate this detection.

According to one aspect of the invention, the radiation set comprises an alignment of antennas arranged transverse to the velocity V of displacement of said vehicle. The magnitude of the complete alignment depends on the size of the objects to be detected.

Another aspect of the invention allows for duplexing means so that the radiation set may be used both in transmission to illuminate said zone to be explored and in reception to collect waves reflected from this zone. A first advantage obtained is that the number of antennas is halved and that the processing of emitted waves and received waves is made coherent, thus improving performances. A second advantage over the known device is that there is no longer a problem with deformations of the panel when overflying zones to be explored.

According to a third aspect of the invention, said vehicle flies over said zone to be explored at an altitude of the order of 10 m, the transverse dimension of the alignment being of the order of 7 m while the illumination frequency varies from 2 to 4 GHz. These different parameters are important. In particular, the choice of the transmission or illumination frequency is conducive to better penetration of the wave in sandy soils and consequently enables better detection of mines buried in it.

Figure 3:
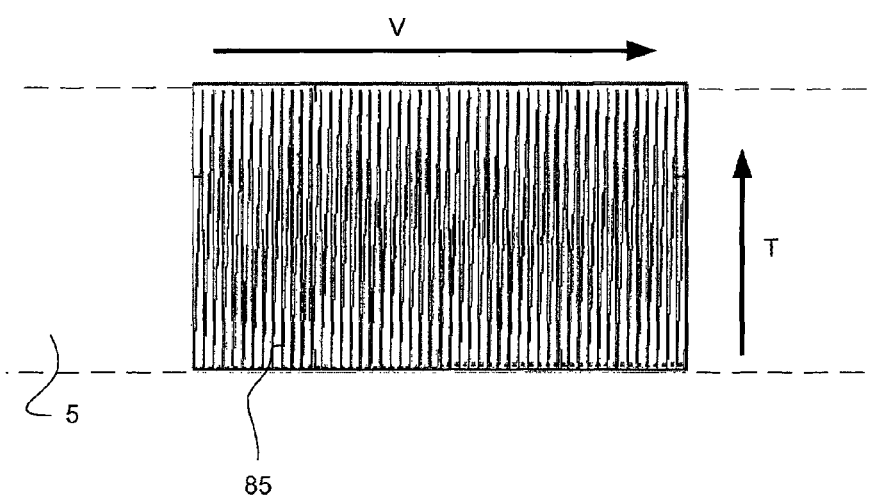
Figure 2:
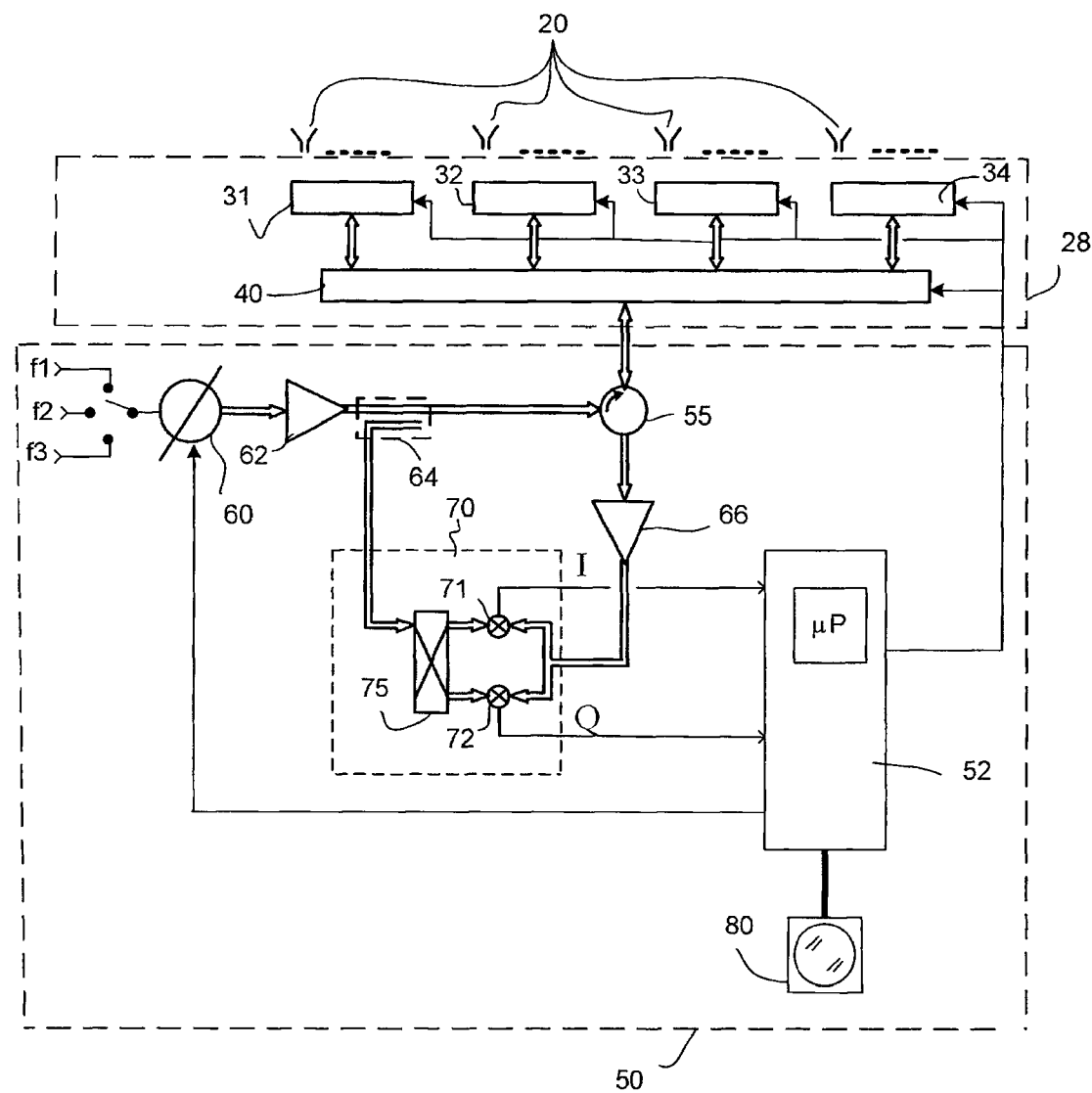
Figure 4:
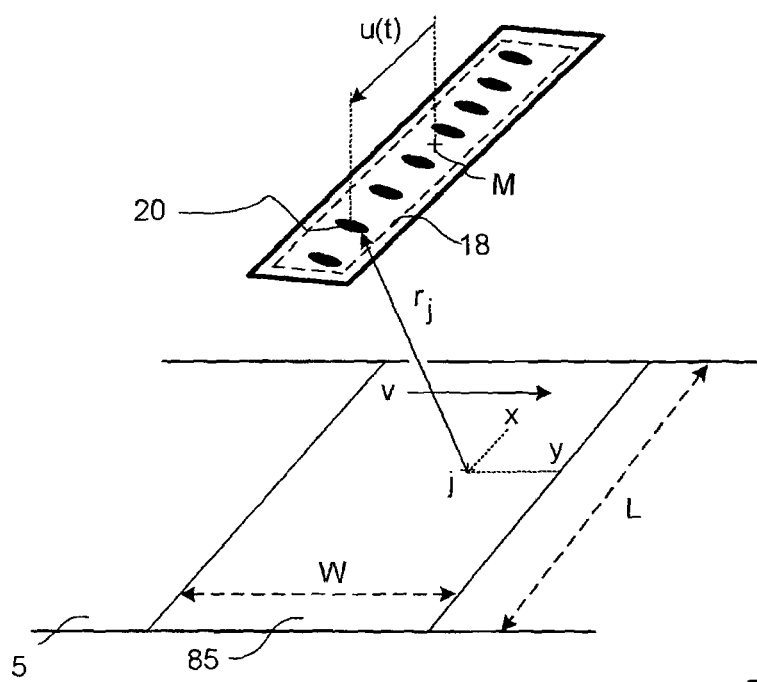
Figure 5:
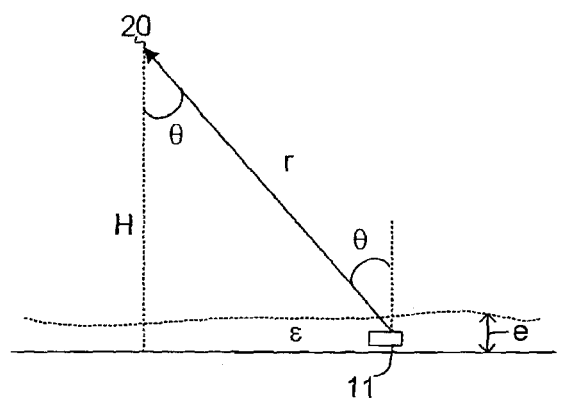

The following description and the appended drawings given as a non-limitative example will help to understand the invention. In the drawings:

FIG. 1 shows a device to detect objects, onboard an aircraft, particularly a helicopter, FIG. 2 shows a scheme of a device according to the invention, FIG. 3 shows scanning of a zone to be explored and formation of a synthetic antenna, FIGS. 4 and 5 are provided to define parameters involved in the signal processing.

Elements in common have the same references in all the figures.

In FIG. 1, reference 1 refers to a helicopter moving at a velocity V in which the device according to the invention is onboard. With this device, it is proposed to explore the ground in a zone 5 to be explored, considered as a mined zone in the example described. Mines 11, 12, 13, etc. are disseminated in this zone (5), and may be buried. The major difficulty in detecting these mines occurs when they are buried in dry sand. Mines are designed to be as undetectable as possible and are made from material with a dielectric constant similar to the dielectric constant of the sand surrounding them. The approximate values of these dielectric constants are 2.7 and 3.1 to 3.4 respectively. Therefore coefficients of reflection that result directly from these constants are close to each other. This means that the processing must be done judiciously.

To overcome this difficulty, a radiation set 18 is provided formed from an alignment of antennas 20 arranged on a panel 25 fixed to the tail of the helicopter 1. Preferably, these antennas are of the Vivaldi type. This helicopter overflies the mined zone 5 at a velocity V compatible with the detection processing to be done and at a height such that the antennas can be considered to be in near zone. Remember that in the near field zone (the Fresnel zone), the ratio of the electric field and the magnetic field is not constant and their distribution in space varies with the distance relative to the antenna. FIG. 1 shows an arrow 27 illustrating the fact that an illumination wave is directed towards the zone and is reflected onto it.

FIG. 2 shows the diagram of the object detection device according to the invention.

Each antenna 20 is connected to a switch system 28 formed from high frequency SP32T type switches or other switches available off-the-shelf. The figure shows four of these switches 31, 32, 33 and 34 each of which manages thirty-two accesses on so-called upstream accesses, such that the number of antennas is 128. A single downstream access corresponds to these four upstream accesses of these switches. The downstream accesses of these switches 31 to 34 are connected to upstream accesses of a fifth switch 40.

All these switches 31-34, 40 depend on a processing circuit 50 and more precisely a processing device 52 that manages all operating processes of the device according to the invention.

Since the antennas 20 operate both in transmission and in reception, duplexing means 55 are provided forming part of the processing circuit 50 and composed of at least one circulator to separate waves to be transmitted and received waves. An access of this circulator is connected to a downstream access of switch 40.

Preferably, the switching system 28 and the circulator 55 are placed on the panel 25 and therefore close to the antennas 20.

The waves to be emitted are produced from a voltage controlled oscillator (VCO) reference 60. Before being applied to the circulator 55, the output wave 5 from the oscillator 60 passes through an amplifier 62 that provides the necessary power to the wave that will finally be emitted by the antennas 20 and by a directive coupler 64 that will sample a small part of the wave at the output from the amplifier 62.

Another access to the circulator 55 collects the received wave that is firstly amplified by an amplifier 66 before being applied to a detector in quadrature 70 formed from two mixers 71 and 72 with two inputs, one of which receives the output signal from the amplifier 66 and the other a replica of the signal from the oscillator 60 through the coupler 64. The phases of the replicas applied to the inputs of the two mixers are shifted by 90°. This is done by an appropriately connected 3 dB coupler 75. The device 52 then processes the output signals I and Q from the detector 70.

This processing device 52 outputs a map of the explored zone on which detected mines are shown highlighted, for example on a screen 80.

The processing device 52 generates this map based on a synthetic aperture of the antenna as shown in FIG. 3. This figure illustrates the zone 5 to be explored and the plot 85 of the synthetic antenna resulting from the processing done by the processing device 52. This plot 85 moves on the zone at velocity V that is the velocity of the helicopter and T represents the scanning rate obtained by sequential switching of the different antennas 20 by action on switches 31-34 and 40. This synthetic antenna gives the necessary resolutions of the order of 7 cm corresponding to mines. The altitude is 10 m and the illumination frequency varies between 2 and 3 GHz.

According to one embodiment, the oscillator frequency can change every 2 or 3 microseconds such that perception of the highlighted points changes. If a mine does not show up as a highlighted point for one frequency, it may show up as a highlighted point at a different frequency because of the Doppler effect induced by switching of the elements in the antenna network. To achieve this, the frequency of the oscillator 60 can change to one of the frequencies f1, f2 or f3 under the control of the processing device 52.

The device according to the invention functions as follows.

FIG. 4 shows the essential elements for a simplified explanation of the signal processing. The zone 5 to be analysed and the plot 85 of the synthesised antenna are displayed in FIG. 4. The antenna plot 85 extends over a width W and a length L defined from the aircraft velocity "V". This zone is broken down into a set of points J arranged in two dimensions x and y respectively: along the direction of the width and along the displacement of the aircraft. Each of these points reflects the wave transmitted from the aircraft and returns it to the radiation set 18 comprising the alignment of antennas 20. The reflected wave at point j is denoted $r_j$. The signal S(t) received at an antenna 20 for which the location is defined by a reference point M of the alignment 20 may be written as follows:

$$S(t) = \sum_J \frac{\exp\left(i\frac{2\pi}{\lambda}\right)(\bar{u}(t) - \bar{r}_j)}{(\bar{u}(t) - \bar{r}_j)^2} \quad (1)$$

equation in which:
J gives the location of the point in said zone 5,
$\vec{u}(t)$ gives the location of the antenna A in the alignment 20 and also as a function of time t defining switching of the antenna.
$\lambda$ is the wavelength of the radiation.
i is such that $i^2 = -1$ This signal contains the contribution of waves received by the different antennas in the network 20.

The following formula is used to determine the reflection Aj at a given point on the ground:

$$A_j = \sum_t S(t) \cdot \exp\left[-i\frac{2\pi}{\lambda} \cdot (\bar{u}(t) - r0_j + f(e, \varepsilon, \theta(t)_j))\right] \quad (2)$$

This formula (2) represents the inverse operation of the previous operation but after adaptive filtering, in other words the contribution of other reflected waves not at the point located in "j" have been eliminated.

Therefore, in this formula $$\exp\left[-i\frac{2\pi}{\lambda} \cdot (r0_j)\right]$$

corresponds to adapted filtering and $$f(e, \varepsilon, \theta(t)_j) = e \cdot \sqrt{\varepsilon} \cdot \left[1 + \frac{(\theta(t)_j)^2}{2 \cdot \varepsilon}\right] \quad (3)$$

The parameters involved in formula (3) are described with reference to FIG. 5:

θ is the angle from which the point on the ground is perceived and is equal to the angle of incidence of the wave at the point considered.

e is the thickness of the sand in which the mine is buried.

$\in$ is the dielectric constant of this sand.

Note that the height H at which the aircraft is overflying determines the value of the modulus of r.

In practice, the value of A gives the indication of the presence of mines, through variations of brightness on the screen 80.

Although the description has been given for a mine detector capable of detecting mines under unfavourable conditions, the invention will be even more applicable for the detection of objects in circumstances more favourable that those described above.

Note that the method will preferably be repeated for three different frequencies at a sufficient spacing. The images obtained may contain highlighted or dark areas due to different combinations of coefficients of reflection of interfaces between the ground and the mine.

The invention claimed is:

1. Device for detecting objects placed in a zone to be explored, said device being placed on a vehicle moving at a velocity V and comprising a panel extending transverse to the velocity V of said vehicle on which a radiation set is arranged to transmit signals at an illumination frequency and to receive signals reflected from said zone, and a processing circuit to provide information about the presence of said objects after processing of the reflected signals, wherein the radiation set comprises a plurality of antennas arranged in an array that is transverse to the velocity V of displacement of said vehicle wherein the processing circuit is such that a received signal in the form:

$$S(t) = \sum_J \frac{\exp\left(i\frac{2\pi}{\lambda}\right)(\overline{u}(t) - \vec{r}_j)}{(\overline{u}(t) - \vec{r}_j)^2}$$

equation in which:
j belongs to a set J of points defining points in the zone to be analysed
ü(t) gives the location of the antenna along alignment at time t
X is the wavelength of the radiation
i is such that i=−1
is processed so that, after adapted filtering, a signal $A_j$ is generated representative of the reflection from a point j such that:

$$A_j = \sum_t S(t) \cdot \exp\left[-i\frac{2\pi}{\lambda} \cdot (\overline{u}(t) - r_j + f(e, \varepsilon, \theta(t)_j))\right]$$

in this latter formula:
θ is the angle from which the point on the ground is perceived and is equal to the angle of incidence of the wave at the point considered
$r_j$ being the reflection vector of the considered point also defined by the altitude H of the vehicle overflying the zone $$f(e, \varepsilon, \theta(t)_j) = e \cdot \sqrt{\varepsilon} \cdot \left[1 + \frac{(\theta(t)_j)^2}{2 \cdot \varepsilon}\right]$$

where:
e is the thickness of the medium in which the object to be detected is buried, e is the dielectric constant of this medium.

2. Device to detect objects according to claim 1, comprising a duplexing device so that the radiation set used both for transmission of signals at the illumination frequency and for reception to collect said reflected signals.

3. Device to detect objects according to claim 1, wherein the vehicle is at a distance from the zone to be explored such that said antennas operate in a close zone.

4. Device to detect objects according to claim 2, wherein the duplexing device includes at least one circulator.

5. Device to detect objects according to claim 1, wherein said antennas are composed of Vivaldi type antennas.

6. Device to detect objects according to claim 1, comprising a switching system to use each of said antennas.

7. Device to detect objects according to claim 6, wherein the switching system is arranged on said panel.

8. Device to detect objects according to claim 2, wherein said duplexing device is arranged on said panel.

9. Device for detecting objects placed in a zone to be explored, said device being placed on a vehicle moving at a velocity V and comprising a panel on which a radiation set is arranged to transmit signals at an illumination frequency and to receive signals reflected from said zone, and a processing circuit to provide information about the presence of said objects after processing of the reflected signals, wherein the radiation set comprises a plurality of antennas arranged in an array that is transverse to the velocity V of displacement of said vehicle; and
comprising a switching system adapted to cooperate with a processing device to produce a synthetic antenna,
wherein the processing device is such that a received signal in the form:

$$S(t) = \sum_J \frac{\exp\left(i \cdot \frac{2\pi}{\lambda}\right)(\overline{u}(t) - \vec{r}_j)}{(\overline{u}(t) - \vec{r}_j)^2}$$

equation in which:
j belongs to a set J of points defining points in the zone to be analysed
ü(t) gives the location of the antenna along a direction of the alignment at a time t
X is the wavelength of the radiation
i is such that i=−1
is processed so that, after adapted filtering, a signal $A_j$ is generated representative of the reflection from a point j such that:

$$A_j = \sum_t S(t) \cdot \exp\left[-i\frac{2\pi}{\lambda} \cdot (\overline{u}(t) - r_j + f(e, \varepsilon, \theta(t)_j))\right]$$

in this latter formula:
θ is the angle from which the point on the ground is perceived and is equal to the angle of incidence of the wave at the point considered
$r_j$ being the reflection vector of the considered point also defined by the altitude H of the vehicle overflying the zone $$f(e, \varepsilon, \theta(t)_j) = e \cdot \sqrt{\varepsilon} \cdot \left[1 + \frac{(\theta(t)_j)^2}{2 \cdot \varepsilon}\right]$$

where:
e is the thickness of the medium in which the object to be detected is buried,
e is the dielectric constant of this medium.

10. Device to detect objects according to claim 1, wherein when said vehicle overflies said zone, the transverse dimension of the alignment is such that a resolution corresponding to the objects is obtained while the illumination frequency extends from 2 to 4 GHz.

11. Device to detect objects according to claim 1, wherein said objects are mines.

* * * * *